Figure 3:
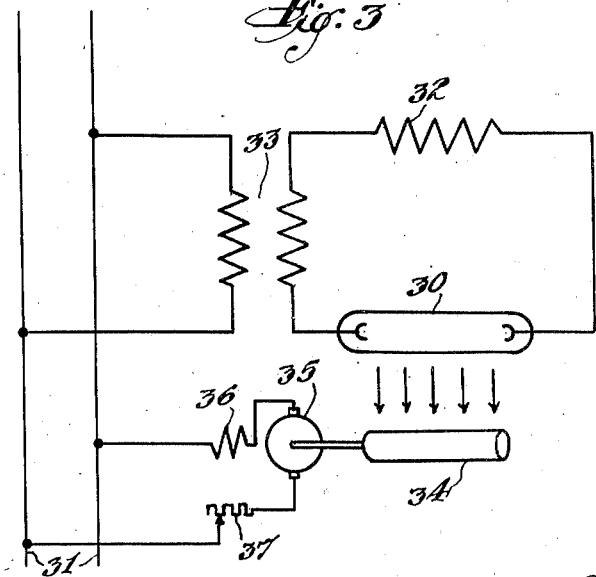

Nov. 19, 1940.   H. LAUB   2,222,148
IRRADIATION DEVICE
Filed Dec. 1, 1937   2 Sheets-Sheet 1
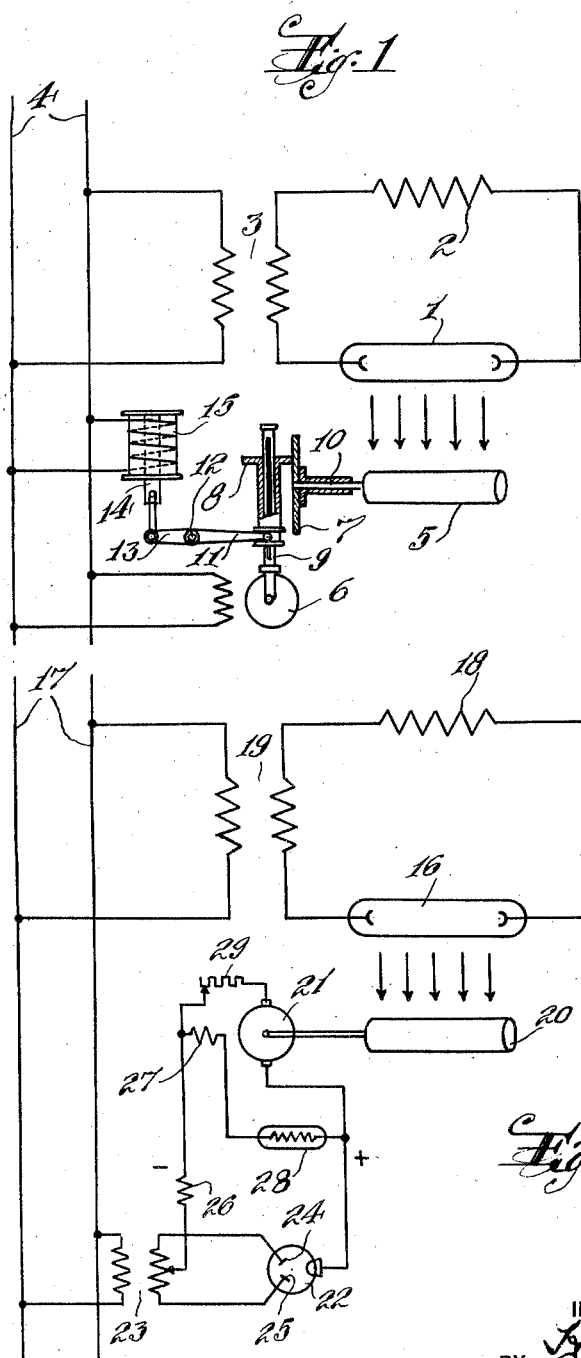

Patented Nov. 19, 1940

2,222,148

UNITED STATES PATENT OFFICE 2,222,148

IRRADIATION DEVICE

Hans Laub, Millburn, N. J., assignor to Hanovia Chemical and Manufacturing Company, Newark, N. J., a corporation of New Jersey Application December 1, 1937, Serial No. 177,502

7 Claims. (Cl. 250—52)

This invention relates to the control of irradiation devices; and more particularly to the provision of means for maintaining constant the total energy delivered to a given area being irradiated.

In apparatus in which a solid, liquid or gaseous substance is exposed to light rays, and in particular to ultraviolet light rays, chemical reactions are produced in the substance and the amount of ultraviolet energy absorbed determines the chemical effects produced quantitatively and qualitatively. The ultraviolet energy absorbed by a unit of the exposed area is the product of the intensity of the ultraviolet light times the exposure time. It is often desired, in a process in which the chemical action of ultraviolet radiations is used, to keep this product, that is, the ultraviolet energy absorbed, as closely constant as possible in order to obtain a certain chemical effect. In the following specifications there is described a method by which the total ultraviolet energy received by a surface of given area can be kept as nearly constant as is desired and independent of the voltage which supplies the energy for the irradiation apparatus.

The intensity of a light source, and in particular of an ultraviolet source, is a function of the wattage input to the light source, and this wattage input in turn is determined by the voltage of the circuit which supplies the current to the light source. In most practical installations the supply voltage is not kept strictly constant but fluctuates within a given range of, for instance + or —5%. To what extent this fluctuation of the supply voltage effects the intensity of the light source depends mainly on the electrical characteristics of the light source and the circuit in which it is connected. If a lamp is used in which an electric discharge or an arc in an atmosphere of a gas or a vapor is maintained, the variations in the intensity of the light emitted from this arc are generally very considerable if the supply voltage fluctuates. With a voltage fluctuation range of + or —5% there may correspond a range of variation of + or —10%, or even higher, in the intensity of the light emitted from the source.

If the light source is used for an irradiation process whereby the chemical action produced by the visible or ultraviolet rays is very sensitive to the light energy absorbed, that is, the total amount of light received by a given area in a given amount of time, then a variation of the light energy of say + or —10% is not tolerable. The light energy, as mentioned before, is the product of intensity and exposure time, and if this product is to be kept constant either the supply voltage must be kept strictly constant or the exposure time must vary inversely proportional to the variation of the light intensity.

It is possible, of course, to keep the voltage of the electrical supply circuit constant by control devices which may be made automatic if desired. However, such control devices for maintaining a constant voltage are usually quite expensive and complicated, in particular if the power consumption of the light source is considerable, as is the case in many practical irradiation devices. The light sources for blueprinting machines, for instance, or milk irradiators and similar apparatus, often have a power consumption of several k. w. If alternating current is used, the control device has to be built for the total k. v. a. load of the circuit of the light source, which in many cases is considerably higher than the actual wattage consumption. If, for instance, a constant voltage output transformer were to be used for maintaining constant voltage in the circuit of the light source with the primary or supply voltage fluctuating within the range mentioned above, then this transformer has to be so dimensioned that it can take care of the entire k. v. a. load of the burner circuit which in practical cases might be 10 k. v. a. or more.

It has been found that in many cases it is much simpler and less expensive to vary the exposure time inversely proportional to the light intensity instead of trying to keep the light intensity constant by keeping the supply voltage constant. As an example, for an application of this type, blueprinting machines might be mentioned, in which light sensitive paper is exposed to visible and ultraviolet light which either penetrates an original tracing on transparent paper or is reflected from an original on non-transparent paper. The light sensitive paper is usually fed to a revolving cylinder or drum and exposed to the light, (resting on the surface of this drum during the latter's rotation). Light sensitive papers used for blueprinting processes are as a rule highly sensitive to changes in the light energy or, expressed in terms of photochemical reactions "the latitude of the paper is very small." This means, for instance, that unsatisfactory prints are obtained if the intensity of the light varies more than 5%. Assuming that the speed of the light sensitive paper during the exposure is maintained constant, a variation in the light intensity of 5% may be caused by a fluctuation of the supply voltage of only 2% or less. If, however, the speed of the light sensitive paper can be lowered by 5% when the intensity of the light decreases by 5%, then the total light energy absorbed by the light sensitive layer on the paper remains unchanged, for the product of intensity and exposure time is kept constant and the result will be a satisfactory print. Should the intensity of the light increase due to an increase in the supply voltage then the light sensitive paper would be overexposed if its speed were maintained constant. However, if the speed is increased proportional to the increase in intensity then the product of intensity and exposure time is again kept constant and a satisfactory print will result.

Similar conditions are obtained in many chemical reactions whereby visible or/and ultraviolet light is causing the reaction. For instance, the curing of patent leather with ultraviolet light might be mentioned whereby the leather hides may be moved on a conveyer belt or a similar arrangement past a bank of ultraviolet lights in order to accomplish a satisfactory curing of the varnish on the patent leather. In this case the intensity of the ultraviolet lights also will vary, depending on the fluctuations of the supply voltage, and it is advisable therefore, according to this invention, to vary the speed of the conveyer belt carrying the leather hides inversely proportional to the light intensity by automatic means.

It is, therefore, an object of this invention to provide in irradiating devices, means for controlling and maintaining constant the total energy received by a given area.

A further object is the provision in irradiating devices of means for compensating for fluctuations in the supply voltage so that the total energy delivered to a surface being irradiated can be substantially maintained constant.

Figure 4:
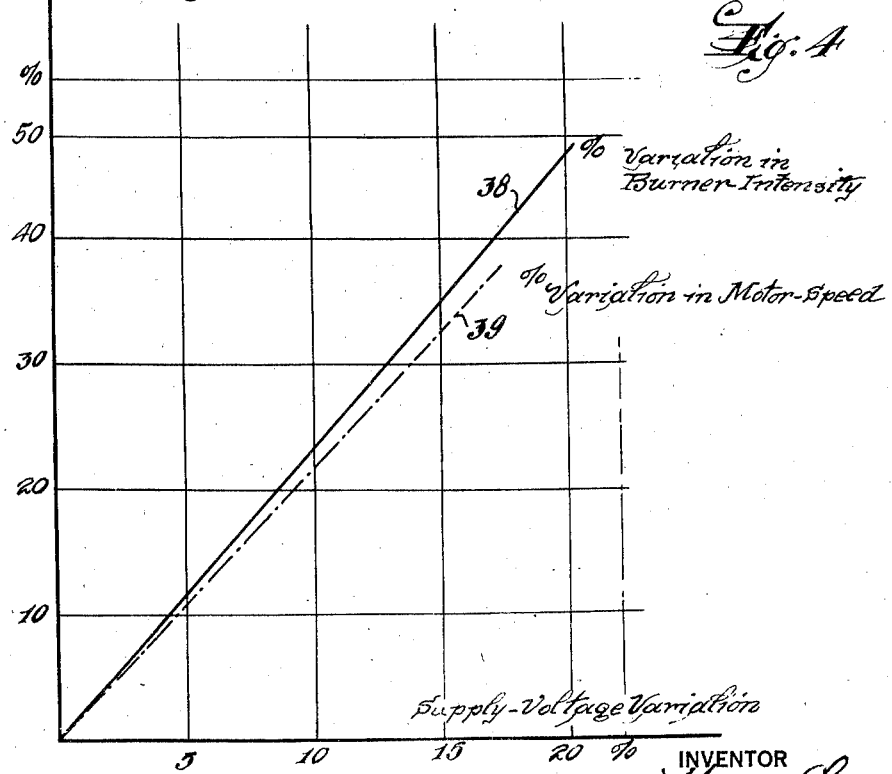

These and other advantageous objects, which will later appear, are accomplished by the simple and practical construction and arrangement of parts hereinafter described and exhibited in the accompanying drawings, forming part hereof, and in which:

Fig. 1 is a diagrammatic view of an irradiating device embodying one form of the invention, Fig. 2 is a diagrammatic view of an irradiating device embodying a modified form of the invention, Fig. 3 is a diagrammatic view of a further modification of the invention, and Fig. 4 are curves obtained from actual measurements with a device as shown in Fig. 3.

Referring to Figure 1, a light source 1, for instance a mercury vapor arc burner, is connected to an electrical circuit consisting of a reactive or ohmic resistance 2, and a transformer 3, which is supplied with power from an alternating current supply 4. The voltage of the supply lines 4, will in all practical cases fluctuate within a more or less limited range and accordingly the intensity of the light emitted from the burner 1 will vary. The light from the burner 1, falls on a revolving drum or cylinder 5, which during the exposure carries on its surface the material which is to be irradiated, for instance, light sensitive paper, leather, or impregnated textiles which are to be cured, etc. This rotating cylinder, 5, is driven by an electric motor 6, which is fed from the same alternating current power supply 4, as the light source. The electric motor 6, is coupled mechanically with the revolving drum 5, through a variable speed reduction gear which for example might consist of a friction drive with a wheel, 7 directly coupled with the shaft 10 of the drum 5, and a wheel 8, which is driven by the shaft 9 of the motor 6. Power is transmitted from shaft 9 to shaft 10 of the rotating drum through friction between wheel 7 and wheel 8. The speed ratio of the two shafts 9 and 10 is determined by the "friction radius," that is, the distance between the center of wheel 7 and the circumference of wheel 8. This distance can be varied at will inasmuch as wheel 8 is mounted on shaft 9 in such a way as to permit its sliding along shaft 9 in axial direction. If wheel 8 is moved closer to the center of wheel 7, the number of revolutions of drum 5, will increase, and if wheel 8 is moved further away from the center of wheel 7, then the number of revolutions of cylinder 5 will decrease. Wheel 8 can be shifted along shaft 9 by means of lever 11, which is pivotally mounted on an axle 12, and which has a short extension arm 13, which in turn is connected to a plunger 14. This plunger 14, constitutes the anchor of a solenoid 15. The stationary coil of this solenoid is fed also from the alternating current power supply 4. If, therefore, the voltage of supply lines 4 varies, the movable plunger 14, will be moved by the magnetic forces exerted on it in the solenoid. Assuming, for instance, the voltage of supply line 4 increases, the magnetic field excited by the current in the stationary coil of solenoid 15 will increase also and consequently plunger 14 will be drawn further into the solenoid. This means that arm 13, of the lever will be drawn upwards and arm 11 drawn downwards in Figure 1. Wheel 8 follows the downward movement of arm 11, thereby moving closer to the center of wheel 7. This will, as described before, increase the speed of rotation of cylinder 5, and consequently also the speed of the material carried on its surface and exposed to the light from burner 1.

Should the voltage of supply lines 4 decrease, then plunger 14 moves further out from solenoid 15, thereby moving arm 13 downward and arm 11 upwards. The friction radius of wheels 7 and 8 thereby will be increased and the number of revolutions per minute of drum 5 decreased accordingly.

The rate of change of the speed of drum 5 and the material carried on its surface and exposed to the light can be adjusted so that the speed varies inversely proportional to the intensity variation of the light. For instance, the magnetic circuit of solenoid 15, can be so designed as to obtain the desired displacement of plunger 14, with a given variation in the voltage of supply lines 4. This can be effected, for instance, by proper shaping of the movable anchor of solenoid 15, or by proper dimensioning of the air gap between anchor and stationary core of solenoid 15. The speed ratio also can be influenced by shaping the friction surfaces of wheels 7 and 8 properly, or by any other known means of the mechanical design of the friction gear. It might be desirable also to use instead of the cylindrical solenoid 15, a solenoid of the rotary type whereby the anchor performs an angular movement instead of a linear one.

Referring to Fig. 2, another method is depicted for varying the exposure time inversely proportional with the light intensity. Burner 16 is connected in series with a reactive or ohmic resistor 18, to the secondary of a transformer 19, the primary of which is supplied from lines 17. It is assumed that the electrical characteristics of this circuit are such that the intensity of the light from burner 16 varies linear with the voltage of line 17.

The light of burner 16 again falls on the material to be irradiated which is carried on the surface of drum 20, which now is driven by a direct current motor of the shunt type 21. This motor 21, is supplied with direct current by means of a rectifier 22, for instance, a dry plate rectifier, a Tungar rectifier, or any other convenient type of rectifier. As an example, a single phase half-wave rectifier circuit is shown, consisting of the rectifying transformer 23, which is supplied with alternating current from line 17. The secondary winding of this transformer is connected as usual to the two anodes 24 and 25 of the rectifier. Direct current hereby is generated in a well-known manner with the polarity as indicated by the plus and minus signs in Fig. 2. A "choke coil" 26 might be connected in series with the direct current lines in order to smooth out the ripples of the direct current supplied to the motor. The armature of motor 21 is connected directly to the direct current lines and the field coil 27 of the motor is connected in shunt. In series with coil 27 is connected a "ballast" resistor 28, which keeps the current flowing through the field coil 27, constant, that is, independent of the voltage of the direct current line. This ballast resistor may consist, for example, of an iron wire embedded in an atmosphere of hydrogen within a glass envelope or any other known means of keeping the current constant within a limited range of voltage fluctuations.

The direct current voltage in the motor circuit will vary proportional to the variation of the voltage of alternating current supply line 17, therefore the voltage supply to the armature of direct current motor 21 will vary in a linear function with the supply voltage 17, and since the field current and thereby the magnetic field of the motor is kept constant by means of ballast resistor 28, the speed of the motor will also vary linear with the voltage of line 17. This in turn means that the speed of drum 20 and the material carried on its surface will vary linearly with the supply voltage, that is, in the same relation as was assumed for the light intensity of burner 16.

An adjustable resistor 29, is also shown connected in series with the armature winding of motor 21 which enables the adjusting of the speed of drum 20 at will to any desired value. If, for instance, the intensity of burner 16 drops with increasing age of the burner, as is the case in all burners with a glass or quartz envelope, then the speed of drum 20 should be adjusted gradually higher with the increased age of the burner by means of resistor 29. It is understood of course, that the same effect can be obtained by using an adjustable resistor in the circuit of the field of motor 21 instead of the armature circuit.

In Fig. 3 another method is illustrated for keeping the total light energy constant whereby it is assumed that the light intensity of the burner 30 varies approximately with the square of the voltage of supply line 31. This square function is often found in circuits in which a vapor arc lamp is connected in series with a reactor 32, the latter having an air gap in its magnetic circuit. The burner circuit is supplied with power from an alternating current line 31, over a transformer 33. The light of the burner 30 falls on the material carried on the surface of the revolving drum 34, which in the case of Fig. 3 is driven by an alternating current commutator motor 35, of the series-wound type. In Fig. 3, namely, the armature of motor 35 is connected in series with the field windings 36 and supplied from alternating current line 31. If the voltage of supply line 31 varies, the current in the series connected armature and field windings varies proportionally, and since the current both in the anchor and the stationary coil varies linearly with the voltage, the speed of the motor will vary with the square of the voltage. This, however, means that the number of revolutions of drum 34 will vary with the square of the supply voltage 31, or in other words, in precisely the ratio desired to keep the product of exposure time and intensity constant. It is understood, of course, that speed of motor 35 and drum 34 can be adjusted at will by means of a variable resistor 37 in the motor circuit in order to vary the exposure time at will, for example, depending on the age of the burner 30.

In Fig. 4 the results of actual measurements of the light intensity and speed function are shown which were obtained with a circuit similar to the one illustrated in Fig. 3. Curve 38 shows that the intensity of the burner in the circuit used varies approximately with the square of the voltage of the supply lines. Curve 39 was obtained from actual readings of the R. P. M.'s of a series-wound alternating current motor of the commutator type, as shown in Fig. 3, driving the drum 34. The two curves, 38 and 39 fall very closely together and if desired can be made to even completely coincide. Since the speed of the driving motor follows practically the same curve as the intensity of the burner, if the supply voltage varies, the product of exposure time and intensity, and with it the total light energy received by a given area of the surface of the material which is being irradiated will remain independent of fluctuations of the supply voltage for all practical purposes.

While the above forms of the invention are particularly directed to alternating current, it is obvious that modifications of the invention can be readily made to enable the use of direct current without deviating from the principles involved.

It should be further noted that the invention herein disclosed is not confined to the use of ultraviolet lamps but can be effectively used in connection with photo-chemical devices employed in visible or infra red variations, and with other electrical light sources.

The foregoing disclosure is to be regarded as descriptive and illustrative only, and not as restrictive or limitative of the invention, of which, obviously, many embodiments may be constructed, including many modifications, without departing from the spirit and scope of the invention herein denoted and set forth in the appended claims.

Having thus described my invention, what I claim as new and desire to secure by Letters Patent, is:

1. In a control device for apparatus for irradiating substances by ultraviolet rays, said apparatus having a rotatable cylinder over which substances to be irradiated are passed and an ultraviolet ray generator, a source of electric power for said generator, an electric motor, variable gear means for driving said cylinder by the motor, and means connected to the source of electric power to vary said gear means to change the speed of rotation of the cylinder to compensate for variations in the voltage of the source of electric power so that the dosage of the ultraviolet radiations on the substance being irradiated will be substantially constant.

2. A method of irradiating a moving solid substance of predetermined quantity which comprises subjecting said substance while in motion to the irradiation of a light source the intensity of which varies with fluctuations of the voltage of the supply circuit, and adjusting the velocity of said motion during irradiation to increase the speed of motion with an increase of the voltage of the supply current for the ultraviolet ray generator and to decrease the speed of motion with a decrease of the voltage of the supply current for the ultraviolet ray generator, whereby the dosage of the ultraviolet radiations on the substance being irradiated will be substantially constant.

3. A method of irradiating a moving solid substance of predetermined quantity which comprises subjecting said substance to ultraviolet radiation from a mercury vapor lamp while said substance is located on a rotating drum, the intensity of said mercury vapor lamp varying with fluctuations of the voltage of the supply circuit, and adjusting the velocity of the rotatory movement of the drum to increase the speed of rotation of the drum with an increase of the voltage of the supply current for the ultraviolet ray generator and to decrease the speed of rotation of the drum with a decrease of the voltage of the supply current for the ultraviolet ray generator, whereby the dosage of the ultraviolet radiations on the substance being irradiated will be substantially constant.

4. In the irradiation of a moving solid substance of predetermined quantity by means of an irradiating lamp the intensity of whose radiations varies with the fluctuations of the voltage of the supply circuit, the provision of means connected to the supply circuit to adjust the velocity of the motion of the substance being irradiated to increase the speed of motion with an increase of the voltage of the supply current for the ultraviolet ray generator and to decrease the speed of motion with a decrease of the voltage of the supply current for the ultraviolet ray generator, whereby the dosage of the ultraviolet radiations on the substance being irradiated will be substantially constant.

5. In the irradiation of solid substance of predetermined quantity by means of a mercury vapor arc lamp radiating ultraviolet rays the intensity of which fluctuates with changes in the voltage of the supply circuit, a method of maining constant the amount of ultraviolet energy absorbed by said substance, consisting in adjusting the velocity of the movement of said substance during irradiation to increase the speed of the movement with an increase of the voltage of the supply current for the ultraviolet ray generator and to decrease the speed of the movement with a decrease of the voltage of the supply current for the ultraviolet ray generator, whereby the dosage of the ultraviolet radiations on the substance being irradiated will be substantially constant.

6. In a control device for an apparatus for irradiating moving substances with ultraviolet rays, said apparatus including an ultraviolet ray generator, a source of electric power for said ultraviolet ray generator, a cylinder rotatably mounted, an electric motor, friction gearing for driving said cylinder by the motor, and means connected to the source of electric power to adjust said friction gearing to increase the speed of rotation of the cylinder with an increase of the voltage of the supply current for the ultraviolet ray generator and to decrease the speed of rotation of the cylinder with a decrease of the voltage of the supply current for the ultraviolet ray generator, whereby the dosage of the ultraviolet radiations on the substance being irradiated will be substantially constant.

7. In a control device for an apparatus for irradiating moving substances with ultraviolet rays, said apparatus including an ultraviolet ray generator, a source of electric power for said ultraviolet ray generator, a rotatably mounted cylinder, an electric motor, friction gearing for driving said cylinder by the motor, an electromagnet having its solenoid connected to the source of electric power, said solenoid having a plunger, and means connected to the plunger and to the friction gearing to adjust said friction gearing to increase the speed of rotation of the cylinder with an increase of the voltage of the supply current for the ultraviolet ray generator and to decrease the speed of rotation of the cylinder with a decrease of the voltage of the supply current for the ultraviolet ray generator, whereby the dosage of the ultraviolet radiations on the substance being irradiated will be substantially constant.

HANS LAUB.